March 24, 1970     J. C. SPITSBERGEN     3,501,948
PROCESS FOR DETERMINING STRESS IN AN ELASTOMERIC MATERIAL
Filed June 7, 1967
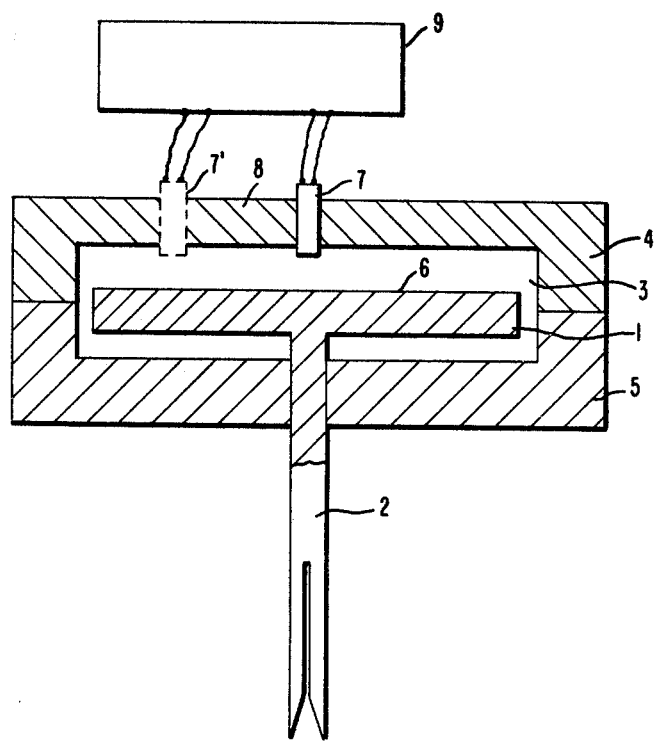
INVENTOR
JAMES C. SPITSBERGEN
BY Raymond E. Blomstedt
ATTORNEY 3,501,948
PROCESS FOR DETERMINING STRESS IN AN
        ELASTOMERIC MATERIAL
James C. Spitsbergen, Wilmington, Del., assignor to E. I.
  du Pont de Nemours and Company, Wilmington, Del.,
  a corporation of Delaware
          Filed June 7, 1967, Ser. No. 644,288
                   Int. Cl. G01n 3/24
U.S. Cl. 73—101                                3 Claims

ABSTRACT OF THE DISCLOSURE

An improved process and viscometer whereby viscosity of an elastomeric material is measured by rotating or oscillating a circular disc to impose shearing stress on a test specimen of the material, the improvement being a pressure transducer communicating with the interior of the chamber to indicate pressure variations in the material at a position normal to the disc. The process and apparatus measures normal stresses in viscoelastic materials and permits their behavior during subsequent extrusion or calendering to be predicted.

BACKGROUND OF THE INVENTION

Various devices for measuring viscosity are known. One such in general use for elastomers is the Mooney viscometer. Such apparatus is described in U.S. 2,037,529, U.S. 2,722,832 and U.S. 2,737,805 and involves a rotatable cylindrical disc positioned in a closed chamber of constant volume which can be filled with a specimen, the viscosity of which is to be determined. The viscosity referred to, the Mooney viscosity, is a function of the resistance which the specimen exerts against rotation of the disc (i.e., the shearing deformation of the specimen) and this resistance is communicated to an external means for indicating the magnitude of this resistance, as for example, a gauge in which a pointer moves along a calibrated scale.

Known devices for measuring viscosities have not been entirely suitable for evaluating elastomers where utilities dependent upon "nerve" or "elastic memory" are important. For example, prior art measurements of the Mooney viscosity of an elastomer do not permit accurate predictions to be made concerning ultimate performance of the polymer with respect to sheet shrinkage or extrudate expansion during processing such as calendering, extrusion, molding, etc. For example, with a given extrusion die one cannot predict accurately on the basis of prior art Mooney viscosity measurements, just what diameter extruded product the die will produce because the extrudate may expand very substantially and unpredictably after leaving the die. There has been a need for a procedure and apparatus which would permit future performance of elastomers to be predicted without additional testing.

THE INVENTION

In accordance with this invention an apparatus and process is provided for measuring conventional viscosity and also for determining the "nerve" of viscoelastic materials, thereby permitting predictions regarding their performance characteristics under subsequent processing and conditions which are affected by this "nerve." The "nerve" of an elastomer denotes its firmness, strength and elasticity, and is determined according to this invention by accurately measuring normal stresses produced when the elastomer is subjected to a viscosity measurement. This is accomplished by placing the elastomer between a disc and another surface, so that it contacts both, and rotating or oscillating the disc while measuring variations in pressure in the material on some small area normal to the disc and spaced therefrom. These pressure variations are conveniently measured by a pressure transducer which communicates with the elastomer and with an external indicating means such as a recorder.

For greatest accuracy the pressure sensitive area of the transducer exposed to the elastomer under test should be small relative to the area of the disc face that is less than about one-fourth and preferably less than one-hundredth the area of the disc face. For the same reason the transducer is preferably axially aligned with the axis of the disc and positioned at a fixed distance from the disc.

The term "disc" is used because rotors in viscometers are normally cylinders of small height but any practical equivalent useful for measuring viscosity can be used. Thus the face surface can be any geometrical shape but is preferably regular and most preferably round.

Although the advantages of the invention can be attained with no more than a rotatable disc spaced from an adjacent, preferably fixed, surface most desirably the rotatable disc is confined in a closed constant volume cavity as shown in the drawing and found in a conventional Mooney viscometer. In any event the disc and opposing surface usually have planar facing surfaces which are substantially parallel to each other. The term "opposing" is used to indicate a surface positioned opposite to a face of the rotatable or oscillating disc so that the elastomeric material to be tested can be placed between them, sandwich fashion, and will firmly contact both of them during rotation or oscillation of the disc, thereby imposing a shearing stress on the elastomer and providing normal stresses perpendicular to the face of the disc.

An apparatus particularly useful for practicing this invention is a conventional Mooney viscometer modified by inserting at least one small transducer in the upper platen wall preferably in axial alignment with the rotor shaft, the sensing surface of the transducer being spaced at a fixed distance from the surface of the rotor and preferably flush with the interior ceiling of the chamber formed by the platens. The transducer in a preferred embodiment is electrically connected to an external amplifier/recorder which continuously records changes in pressure on the transducer, that is, variation in normal stresses produced by rotation or oscillation of the disc within the chamber containing the elastomer. However, a mechanical or hydraulic connection is also feasible. The variations in normal stresses are measures of the "nerve" of the elastomer being examined under the conditions within the chamber and permit accurate predictions of elastomer performance in subsequent processing (e.g., extrusion, molding, etc.) by comparison with elastomers having known performance characteristics.

The apparatus of this invention can be readily understood by reference to the drawing.

The figure is a sectional view of a Mooney viscometer conventionally used to measure the viscosity of elastomers and shows rotor 1 positioned for rotation (by means, not shown, associated with rotor shaft 2) in closed chamber or cavity 3 formed by bringing together upper platen 4 and lower platen 5. Above and in opposed relationship to the rotor's upper face 6 is pressure transducer 7 positioned in the wall 8 of upper platen 4 and electrically connected to amplifier recorder 9. Variations in pressure within cavity 2 are thereby registered on the recorder and this of course can be done in a continuous chart, if desired.

Although the pressure transducer is preferably positioned, as shown, aligned with the axis of rotor shaft 2, it can be located more or less off center, relative to the rotor shaft, as shown by the dotted lines numbered 7'.

Alternatively transducer 7' can be a second transducer. In a preferred embodiment a transducer is both aligned with the axis of the rotor shaft and has a very small exposed (pressure sensitive) area relative to that of the upper rotor face, desirably less than one-fourth and preferably less than one-hundredth the upper face area of the rotor disc. Transducer(s) can also be positioned below the rotor if desired but alignment with center of the rotor is practically excluded by such an arrangement.

What is claimed is:
1. A process for determining the normal stress created in an elastomeric material in response to shear by the steps comprising:
   (a) shearing a constant volume of the material, in a closed chamber, between a rotating disc and the walls of the chamber wherein at least one wall of the chamber is fixed and in opposing relationship to a face of the disc; and
   (b) measuring the resultant normal stress exerted by the material against the fixed surface opposing the face of the disc over an area which is less than about one-fourth the area of the face of the disc.
2. The process of claim 1 in which the area over which the normal stress is measured is less than one-hundredth the area of the face of the disc.
3. The process of claim 1 in which the area over which the normal stress is measured is axially aligned with the axis of the disc.

References Cited

UNITED STATES PATENTS

| 2,037,529 | 4/1936 | Mooney | 73—101 |
| 2,266,733 | 12/1941 | Bays | 73—59 |
| 3,116,633 | 1/1964 | Cohron | 73—101 |

FOREIGN PATENTS

| 165,410 | 10/1922 | Great Britain. |
| 163,787 | 8/1964 | U.S.S.R. |

OTHER REFERENCES

Transactions of the Society of Rheology, pp. 25–28, call # Q.C. 189 S6. Editor: Bryce Maxwell. Author: H. Markovitz. Date: 1957.

Rheology, pp. 48–53, call # Q.C. 189 E5. Editor: F. Eirich. Author: M. Reiner. Date: 1956.

K. Weissenberg, Nature 159, 310 (1947).

JAMES J. GILL, Primary Examiner

J. WHALEN, Assistant Examiner

U.S. Cl. X.R.

73—60